US008758049B2

(12) United States Patent  
Mochizuki et al.

(10) Patent No.: US 8,758,049 B2  
(45) Date of Patent: Jun. 24, 2014

(54) CONNECTOR

(75) Inventors: Satoshi Mochizuki, Tokyo (JP); Naoki Maeda, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 52 days.

(21) Appl. No.: 13/267,950

(22) Filed: Oct. 7, 2011

(65) Prior Publication Data

US 2012/0088401 A1    Apr. 12, 2012

(30) Foreign Application Priority Data

Oct. 8, 2010    (JP) ................................. 2010-228545

(51) Int. Cl.  
*H01R 13/74*    (2006.01)

(52) U.S. Cl.  
USPC ........................................... 439/559; 439/63

(58) Field of Classification Search  
USPC ................... 439/63, 559, 544, 548, 550, 582  
See application file for complete search history.

(56) References Cited

U.S. PATENT DOCUMENTS

| | | | | |
|---|---|---|---|---|
| 4,702,710 A | * | 10/1987 | Dittman et al. | 439/271 |
| 4,721,481 A | * | 1/1988 | Grellmann et al. | 439/581 |
| 4,927,386 A | | 5/1990 | Neuroth | |
| 5,015,804 A | * | 5/1991 | Nattel et al. | 174/667 |
| 5,399,807 A | * | 3/1995 | Yarbrough et al. | 174/653 |
| 5,405,172 A | * | 4/1995 | Mullen, Jr. | 285/92 |
| 5,487,680 A | * | 1/1996 | Yamanashi | 439/552 |
| 6,986,680 B2 | * | 1/2006 | Wu | 439/551 |
| 7,749,007 B1 | | 7/2010 | Gilliam | |
| 7,900,971 B2 | * | 3/2011 | Chiu | 285/207 |
| 8,134,088 B2 | * | 3/2012 | Naumann et al. | 174/653 |
| 2003/0137372 A1 | | 7/2003 | Fehrenbach et al. | |
| 2004/0150572 A1 | * | 8/2004 | Ohno et al. | 343/711 |
| 2010/0108020 A1 | | 5/2010 | Miretti | |

FOREIGN PATENT DOCUMENTS

| | | |
|---|---|---|
| CN | 1623254 A | 6/2005 |
| CN | 201270398 Y | 7/2009 |
| EP | 1 628 368 A1 | 2/2006 |
| GB | 1 129 499 A | 10/1968 |
| JP | 2-82470 A | 3/1990 |
| JP | 2-95173 U | 7/1990 |
| JP | 9-182284 A | 7/1997 |

OTHER PUBLICATIONS

Communication dated Aug. 21, 2012 issued by the Japanese Patent Office in counterpart Japanese Application No. 2010-228545.  
Extended European Search Report, issued by the European Patent Office in corresponding European Application No. 11184218.3 on Feb. 29, 2012.  
Office Action, dated for Jan. 6, 2014, issued by the State Intellectual Property Office of the People's Republic of China in counterpart Chinese Application No. 201110306289.6.

* cited by examiner

*Primary Examiner* — Hien Vu  
(74) *Attorney, Agent, or Firm* — Sughrue Mion, PLLC

(57) ABSTRACT

A connector includes a base connector and a cylindrical member. The base connector has a cylindrical projection to penetrate through an outside wall of an attachment subject. The cylindrical member is fitted with the cylindrical projection and has a cavity.

11 Claims, 5 Drawing Sheets

CONNECTOR

TECHNICAL FIELD

The present disclosure relates to a connector for providing a wiring outside an electric apparatus and, more particularly, to a connector that complies with a pressure-resistant/explosion-proof standard.

RELATED ART

Electric apparatus to be installed in dangerous places etc. where a flammable gas or vapor of a flammable liquid exists or may exist are required to be provided with a countermeasure against an explosion, and related standards are established. A typical explosion-proof structure of an explosion-proof standard is a pressure-resistant/explosion-proof structure (symbol d).

In the pressure-resistant/explosion-proof structure (symbol d), an electric apparatus which may become an ignition source is placed in an explosion-proof, fully-closed chamber so that even if an explosion occurs inside the chamber the explosion, does not reach the outside of the chamber. This structure is required to be strong enough to withstand an internal explosion and to be able to prevent a flame occurring inside from igniting what is located outside through a gap between joining surfaces of the chamber. As long as a chamber satisfies the above requirements, no restrictions are imposed on an electric apparatus incorporated therein. The case of an electric apparatus itself may such as to satisfy the above requirements.

For example, if an electric apparatus 30 to which an antenna 32 is connected (see FIG. 5A) should satisfy the requirements of the pressure-resistant/explosion-proof structure (symbol d), designing is done so that the region enclosed by a boundary 41 and containing also the antenna 32 satisfies the standard. More specifically, a pressure-resistant/explosion-proof structure (symbol d) can be realized by a pressure-resistant/explosion-proof chamber that contains the region enclosed by the boundary 41. If the case of the electric apparatus 30 itself excluding an antenna connection portion satisfies the requirements, as shown in FIG. 5B a pressure-resistant/explosion-proof structure (symbol d) can easily be realized by using a pressure-resistant/explosion-proof chamber 42 that is attached to the case of the electric apparatus 30.

PRIOR ART DOCUMENTS

Patent Documents

[Patent document 1] JP-A-9-182284

On the other hand, assume a case that as shown in FIG. 5C the antenna 32 is connected to the electric apparatus 30 by an antenna extension cable 34 to dispose the antenna 32 at a place where high sensitivity can be attained. To satisfy the requirements of the pressure-resistant/explosion-proof structure (symbol d) by the same approach as shown in FIG. 5A, designing should be done so that the region enclosed by a boundary 43 and containing the antenna extension cable 34 and the antenna 32 in addition to the electric apparatus 30 satisfies the standard.

In this case, one approach is to construct a pressure-resistant/explosion-proof chamber that contains the antenna extension cable 34, the antenna 32, and the electric apparatus 30. If the case of the electric apparatus 30 itself excluding an antenna extension cable connection portion satisfies the requirements, another approach is possible in which a pressure-resistant/explosion-proof chamber that contains the antenna extension cable 34 and the antenna 32 is constructed and attached to the case of the electric apparatus 30.

However, the antenna 32 may be connected to the electric apparatus 30 by an antenna extension cable 34 that is as long as several tens of meters. In such a case, it is very difficult to adapt a pressure-resistant/explosion-proof chamber to the shape of a path of the antenna 32 and the antenna extension cable 34. This approach is not practical in terms of cost and the number of steps necessary for installation.

SUMMARY

Exemplary embodiments of the invention provide a connector which can realize a pressure-resistant/explosion-proof structure of an electric apparatus easily at a low cost in the case where a wiring is provided outside the electric apparatus.

A connector includes:

a base connector having a cylindrical projection to penetrate through an outside wall of an attachment subject; and a cylindrical member which is fitted with the cylindrical projection in a state that a cavity is formed.

The cavity may be filled with a resin. The cylindrical member may be fitted with the cylindrical projection through a threaded mechanism.

The base connector may be of a water-proof type. The base connector may have a generally truncated-cone-shaped external form.

The cylindrical projection and the cylindrical member may be monolithically formed.

According to the exemplary embodiments of the invention, it is possible to realize a pressure-resistant/explosion-proof structure of an electric apparatus easily at a low cost in the case where a wiring is provided outside the electric apparatus.

DETAILED DESCRIPTION

Figure 1A:
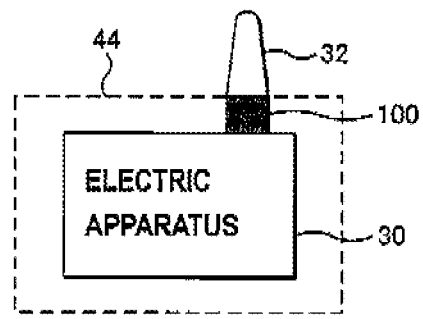
FIGS. 1A-1C are views showing use forms of a connector according to an embodiment.
Figure 1B:
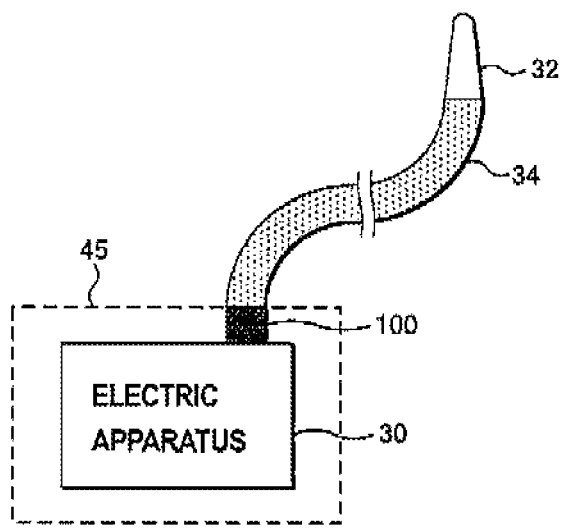
Figure 1C:
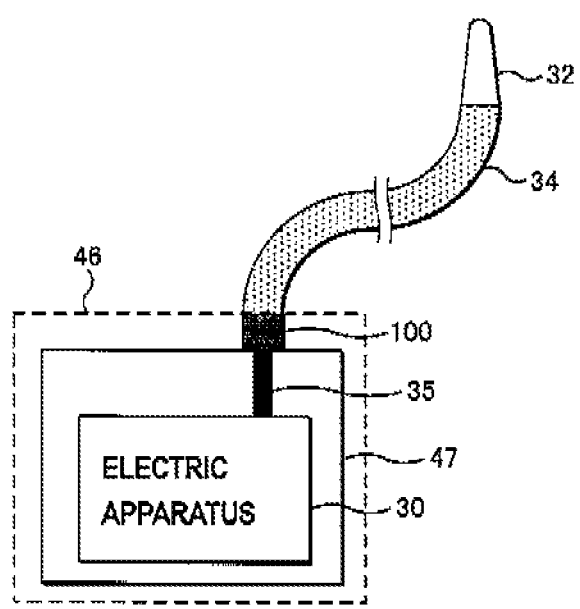
Figure 5A:
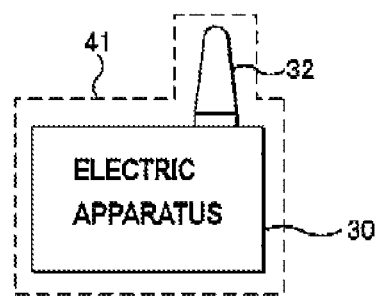
FIGS. 5A-5C are views for explaining a related-art pressure resistant/explosion-proof structure.
Figure 5B:
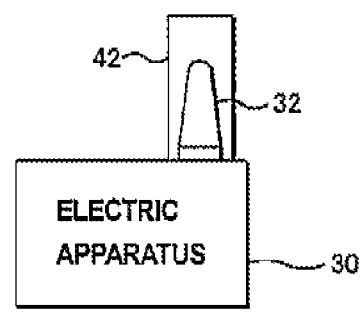
Figure 5C:
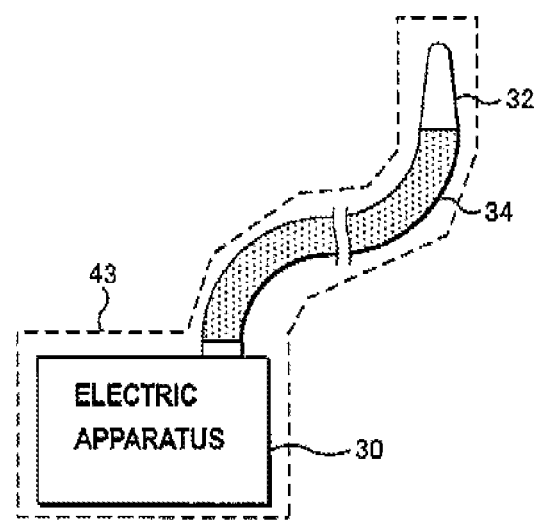

An embodiment of the present invention will be hereinafter described with reference to the drawings. FIG. 1A-1C show use forms of a connector 100 according to the embodiment. Components etc. having the same ones in FIGS. 5A-5C are given the same reference numerals as the latter. FIG. 1A-1C show examples of manners for realizing a pressure-resistant/explosion-proof structure (symbol d) using the connector 100 which complies with the pressure-resistant/explosion-proof standard.

In the example of FIG. 1A, the connector 100 is attached to the case of an electric apparatus 30 and used for connecting an antenna 32 to the electric apparatus 30. In the example of FIG. 1B, the connector 100 is attached to the case of the electric apparatus 30 and used for connecting an antenna extension cable 34 to the electric apparatus 30. The examples of FIGS.

1A and 1B correspond to a case that the case itself of the electric apparatus 30 satisfies the pressure-resistant/explosion-proof standard. In the example of FIG. 1C, the connector 100 is attached to a pressure-resistant/explosion-proof chamber 47 which contains the electric apparatus 30, and is used for connecting an antenna extension cable 34 to a cable 35 which is connected to the electric apparatus 30.

It is assumed that the electric apparatus 30 is required to satisfy the requirements of the pressure-resistant/explosion-proof structure (symbol d). In the configuration of FIG. 1A in which the antenna 32 is directly connected to the connector 100, because of the use of the connector 100 which complies with the pressure-resistant/explosion-proof standard, a boundary 44 which contains the electric apparatus 30 and the connector 100 is regarded as a pressure-resistant/explosion-proof chamber, whereby a pressure-resistant/explosion-proof structure (symbol d) is realized.

Likewise, in the configuration of FIG. 1B in which the antenna 32 is connected to the connector 100 via the antenna extension cable 34, a boundary 45 which contains the electric apparatus 30 and the connector 100 is regarded as a pressure-resistant/explosion-proof chamber, whereby a pressure-resistant/explosion-proof structure (symbol d) is realized.

In the configuration of FIG. 1C in which the antenna extension cable 34 is connected to the connector 100 which is attached to the pressure-resistant/explosion-proof chamber 47, a boundary 46 which contains the pressure-resistant/explosion-proof chamber 47 and the connector 100 is regarded as a pressure-resistant/explosion-proof chamber, whereby a pressure-resistant/explosion-proof structure (symbol d) is realized.

In the embodiment, the connector 100 which complies with the pressure-resistant/explosion-proof standard serves as part of the boundary 44, 45, or 46, whereby the electric apparatus 30 comes to satisfy the requirements of the pressure-resistant/explosion-proof structure (symbol d). The antenna extension cable 34 and the antenna 32 are regarded as being located outside the application range of the pressure-resistant/explosion-proof structure (symbol d). Therefore, the antenna extension cable 34, its length, and the antenna 32 can be selected freely.

Figure 2:
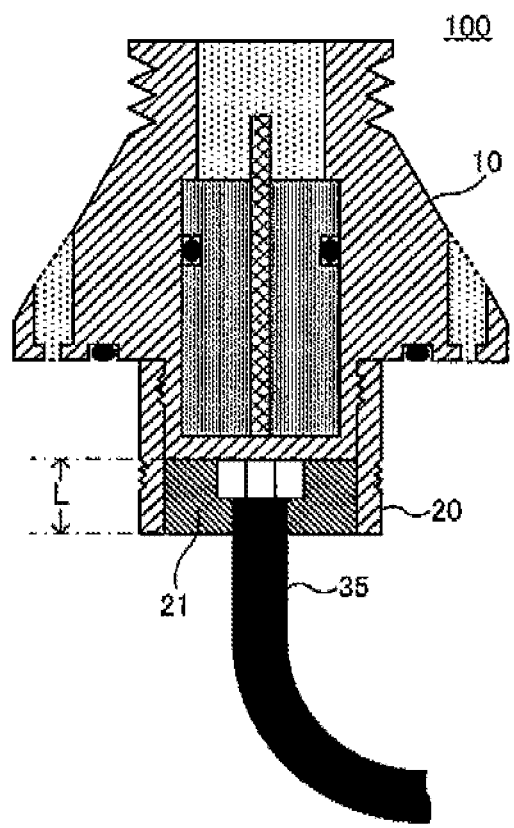
FIG. 2 is a schematic sectional view showing an example configuration of the connector according to the embodiment.
Figure 3A:
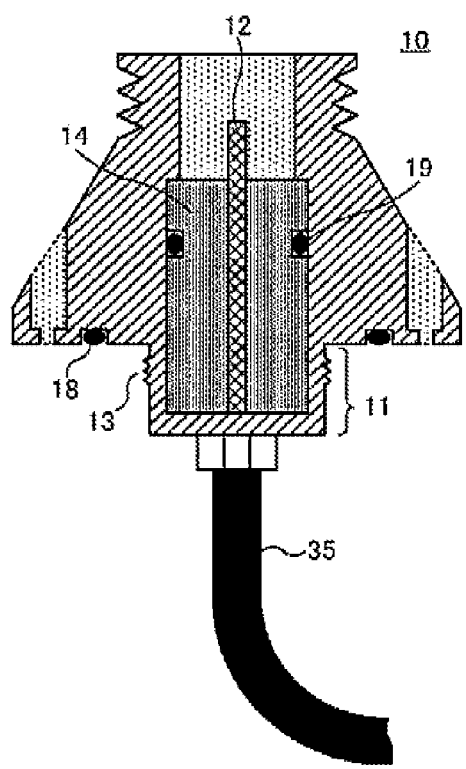
FIGS. 3A and 3B are views showing a general-purpose water-proof high-frequency connector and a cylindrical member.
Figure 3B:
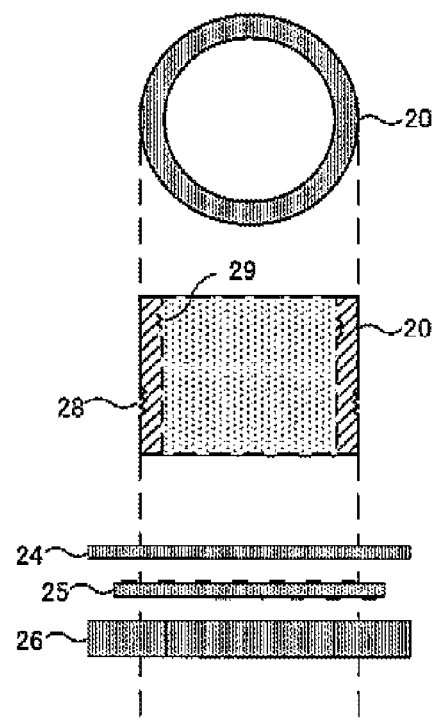

FIG. 2 is a schematic sectional view showing an example configuration of the connector 100 according to the embodiment, which is a bulkhead type high-frequency connector with a fringe. The connector 100 is a combination of an existing, general-purpose water-proof high-frequency connector 10 shown in FIG. 3A and a cylindrical member 20 shown in FIG. 3B. A cavity which is formed in the cylindrical member 20 when it is combined with the high-frequency connector 10 is filled with a resin 21 that forms a cemented joint to satisfy the pressure-resistant/explosion-proof standard. Since a connector which complies with the pressure-resistant/explosion-proof standard is constructed using, as a base, an existing, general-purpose water-proof connector, the embodiment makes it possible to realize connectors that comply with various kinds of pressure-resistant/explosion-proof standards easily at a low cost.

The general-purpose water-proof high-frequency connector 10 has a cylindrical projection 11, and the connector 100 is attached to the case of the electric apparatus 30 or the pressure-resistant/explosion-proof chamber 47 in such a manner that the projection 11 penetrates through its outside wall. The cylindrical member 20 is attached to the projection 11 so as to surround it without forming any gaps. For example, the cylindrical member 20 may be manufactured easily by plating a cylindrical brass member.

For example, the cylindrical member 20 may be attached to the general-purpose water-proof high-frequency connector 10 by means of a threaded portion 29 formed on the inside circumferential surface of the cylindrical member 20 and a threaded portion 13 formed on the outer circumferential surface of the projection 11 of the general-purpose water-proof high-frequency connector 10.

The threaded portions 13 and 29 are formed so that a cavity having a length L is formed in the cylindrical member 20. As described above, this cavity serves as a resin filling space and is filled with the resin 21 which will set to become an insulating material. The resin 21 may be a two-liquid thermosetting silicone potting material, for example. The length L should be greater than or equal to a length that is required by a resin-related part of the explosion-proof standard.

The outer circumferential surface of the cylindrical member 20 is formed with a threaded portion 28 to be used for fixing the connector 100 to the case of the electric apparatus 30 or the pressure-resistant/explosion-proof chamber 47 using a flat washer 24, a washer 25, and a nut 26.

The connector 100 is electrically connected to internal circuits of the electric apparatus 30 by the cable 35 and electrically connected to the antenna 32 or the antenna extension cable 34 by a plated core wire 12. The core wire 12 is surrounded by a dielectric 14 such as a carbon fluoride resin or the like to form a coaxial structure.

Instead of the cable 35, a harness, another connector, an adaptor, or the like may be used to connect the connector 100 to the electric apparatus 30. FIGS. 2 and 3 show, in a simplified manner, the configuration of the water-proof connector 100, and it may have a hermetic internal structure. Where an existing connector is used which has a space that can be filled with the resin 21 having a necessary thickness, the connector 100 can be constructed without combining the cylindrical member 20.

Since the connector 100 employs the general-purpose water-proof high-frequency connector 10, an O-ring 19 is used as a countermeasure against water penetration from outside the connector 100 and an O-ring 18 is used as a countermeasure against water penetration into the case of the electric apparatus 30 or the pressure-resistant/explosion-proof chamber 47. Typical examples of the high-frequency connector 10 are a SNC connector, an SMA connector, 7 mm connector, 3.5 mm connector, 2.92 mm connector, 2.4 mm connector, 1.85 mm connector, 1.0 mm connector, a INC connector, and an N connector; However, the high-frequency connector 10 is not limited to them.

Figure 4A:
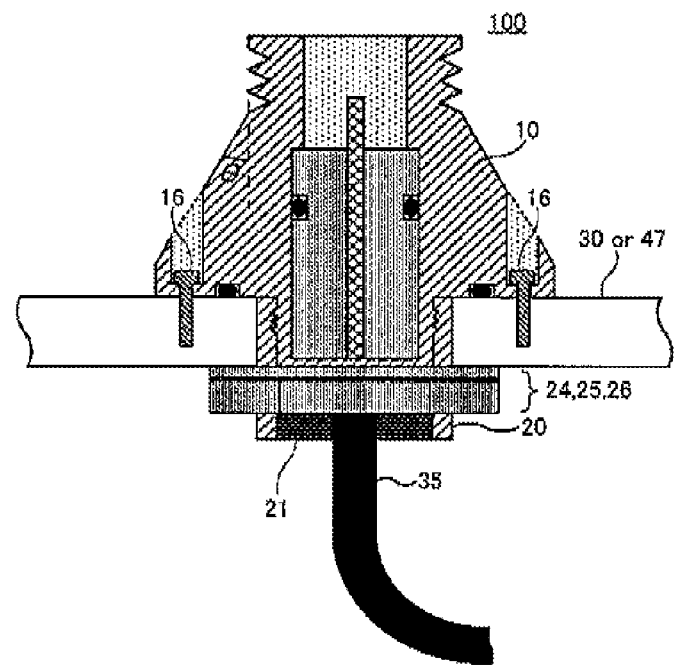
FIGS. 4A and 4B are views showing a state that the connector is connected to a case of an electric apparatus or a pressure-resistant/explosion-proof chamber.

FIG. 4A shows a state that the connector 100 is connected to the case of the electric apparatus 30 or the pressure-resistant/explosion-proof chamber 47. In this example, the connector 100 is connected to the case of the electric apparatus 30 or the pressure-resistant/explosion-proof chamber 47 using screws 16 that are inserted in screw holes that are formed through the fringe of the general-purpose water-proof high-frequency connector 10 and the washers and nut 24-26. Alternatively, either the screws 16 or the washers and nut 24-26 may be used.

It is desirable that the screws 16 be of such a type as to require a special tool for their disengagement (e.g., Tors screws) so that the screws 16 cannot be removed from the outside using pliers, nippers, or the like.

Figure 4B:
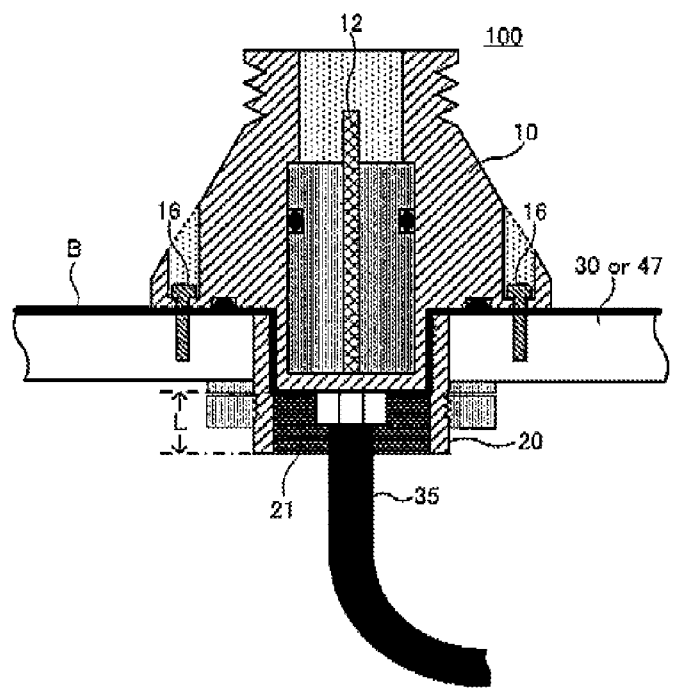

In the embodiment, since the cavity of the cylindrical member 20 is filled with the resin 21 to the extent that the resin 21 has a thickness that is equal or more than a thickness that fills a chamber of the cemented joint of the pressure-resistant/explosion-proof chamber, a boundary B can be regarded as a boundary of a pressure-resistant chamber (see FIG. 4B) when the connector 100 is attached to the case of the electric apparatus 30 or the pressure-resistant/explosion-proof chamber 47. Therefore, basically an explosion-proof structure can be realized without being affected by the structure of the water-proof high-frequency connector 10 itself which is located outside the boundary B and serves as a base of the connector 100.

As a result, although in the embodiment the connector 100 is constructed using the high-frequency connector 10 as a base, connectors that satisfy a pressure-resistant/explosion-proof standard can be constructed using various kinds of existing connectors that are not a high-frequency connector or a water-proof connector.

Incidentally, explosion-proof standards require that a connector be subjected to a steel ball drop test. To reduce impact of this test, as shown in FIG. 4A the connector 100 according to the embodiment employs the water-proof high-frequency connector 10 whose fringe is shaped like a truncated cone that forms an angle θ with the attaching direction (signal transmission direction).

For example, assume that impact that occurs when a steel ball having a weight 1 kg is dropped perpendicularly to the signal transmission direction (in FIG. 4A, in the horizontal direction) from a height 0.7 m is F (N). The impact F' (N) acting perpendicularly on a slant surface having the angle θ is given by:

$$F'=F\cos\theta,$$

which is smaller than in the case of normal incidence. If θ is equal to 45°, the impact of the steel ball dropped is much decreased to about 70%. The angle θ can be set freely.

In general, a hemisphere formed at the tip of a heavy weight used in steel ball drop tests has a diameter 25 mm. Therefore, the impact acting on the connector 100 in a steel ball drop test is decreased further if the length, in the signal transmission direction, of that portion of the connector 100 which projects outward from the case of the electric apparatus 30 or the pressure-resistant/explosion-proof chamber 47 (see FIG. 4A) is shorter than 25 mm.

The embodiment makes it possible to realize a pressure-resistant/explosion-proof structure of an electric apparatus easily at a low cost because as described above a boundary that can be regarded as a boundary of an explosion-proof chamber is formed by using the connector 100 which is a combination of the general-purpose water-proof high-frequency connector 10 and the cylindrical member 20.

More specifically, an existing connector is worked to form a threaded portion for attachment of a cylindrical member to be used for filling of a resin that forms a cemented joint, whereby the existing connector can be used as a base of a connector which satisfies a pressure-resistant/explosion-proof standard. As a result, a pressure-resistant/explosion-proof connector can be manufactured easily at a very low cost. A pressure-resistant/explosion-proof connector can be manufactured by using a base connector that is selected from a wide variety of existing connectors according to a use, which means increase in the degree of freedom in selection of components. Furthermore, it is not necessary to develop a new pressure-resistant/explosion-proof connector.

What is claimed is:

1. An electrical connector comprising:
   a base connector comprising a cylindrical projection configured to penetrate through an opening to an outside wall of a conductive object to which the base connector is attachable; and
   a cylindrical member configured to penetrate through the opening to the outside wall of the conductive object, the cylindrical member being fitted with the cylindrical projection in a state that a cavity is formed;
   wherein the cylindrical member has an interior space and comprises a wall portion that defines the interior space and surrounds the cylindrical projection;
   wherein at least a portion of said interior space comprises the cavity; and
   wherein the cavity is filled with a resin.

2. The electrical connector according to claim 1, wherein the cylindrical member is fitted with the cylindrical projection through a threaded mechanism.

3. The electrical connector according to claim 1, wherein the base connector is of a water-proof type.

4. The electrical connector according to claim 1, wherein the base connector has a generally truncated-cone-shaped external form.

5. The electrical connector according to claim 1, wherein the cylindrical projection and the cylindrical member are monolithically formed.

6. The electrical connector according to claim 1, wherein the cavity formed by fitting the cylindrical member with the cylindrical projection is bounded by an inner surface of the cylindrical member wall portion and a surface of an end portion of the cylindrical projection that is perpendicular to an axis of the cylindrical projection.

7. The electrical connector according to claim 1,
   wherein the cavity is formed by a portion of an inner surface of the cylindrical member and a portion of a surface of the cylindrical projection.

8. The electrical connector according to claim 1, wherein the cylindrical member has a first threaded portion formed on an inner surface thereof and a second threaded portion formed on an outer surface thereof, and the cylindrical projection has a threaded portion formed on an outer surface,
   wherein the second threaded portion of the cylindrical member and the threaded portion of the cylindrical projection are threadingly engageable for fixing the connector relative to the conductive object.

9. An electrical connector comprising:
   a base connector comprising a cylindrical projection configured to penetrate through an opening to an outside wall of a conductive object to which the base connector is attachable;
   the cylindrical projection having a circumferential outer side surface and a substantially enclosed outer end surface; and
   a cylindrical member which has a hollow interior space that is fitted in part with the cylindrical projection in a state that a cavity is formed;
   wherein the cylindrical member surrounds at least a portion of the cylindrical projection,
   wherein the cavity is formed by a portion of an inner surface of the cylindrical member and the end surface of the cylindrical projection, and
   wherein the cavity is filled with a resin.

10. The electrical connector according to claim 9, wherein the cylindrical member has a first threaded portion formed on an inner surface, the cylindrical member has a second threaded portion formed on an outer surface, and the cylindrical projection has a threaded portion formed on the circumferential surface,
    wherein the second threaded portion of the cylindrical member and the threaded portion of the cylindrical projection are threadingly engageable for fixing the connector relative to the conductive object.

11. An electrical connector for coupling a cable to an outside wall of an a conductive object, the wall having a thickness, comprising:
- a base connector comprising a cylindrical projection, configured and sized with a length at least equal or greater than the thickness of the wall to penetrate into the opening to the outside wall, the cylindrical projection having an outside surface and an inside surface with an internal diameter sufficient to enclose the cable; and
- a cylindrical member configured and sized with a length greater than the thickness of the wall to penetrate through the opening to the outside wall of the conductive object and with an internal space defined by an internal diameter sufficient to enclose the outside surface of the cylindrical member, the cylindrical projection being fitted within a portion of the internal space of the cylindrical member such that a cavity is formed, wherein the cavity is filled with a resin.

* * * * *